(12) United States Patent
Wohlganger et al.

(10) Patent No.: US 8,051,025 B2
(45) Date of Patent: Nov. 1, 2011

(54) SYSTEM AND METHOD FOR INTELLIGENT DATA MANAGEMENT OF THE TRANSPORT OF ITEMS WITHIN A TRANSPORT NETWORK

(75) Inventors: Edward A. Wohlganger, Silver Spring, MD (US); Vincent J. Mougey, Springfield, VA (US); Ossam Manea, Leesburg, VA (US)

(73) Assignee: United States Postal Service, Washington, DC (US)

( * ) Notice: Subject to any disclaimer, the term of this patent is extended or adjusted under 35 U.S.C. 154(b) by 841 days.

(21) Appl. No.: 11/806,599

(22) Filed: Jun. 1, 2007

(65) Prior Publication Data
US 2008/0109678 A1 May 8, 2008

Related U.S. Application Data

(60) Provisional application No. 60/809,820, filed on Jun. 1, 2006.

(51) Int. Cl.
*G06F 17/00* (2006.01)
*G06N 5/02* (2006.01)

(52) U.S. Cl. .................. 706/47; 706/45; 706/62

(58) Field of Classification Search .................. None
See application file for complete search history.

(56) References Cited

U.S. PATENT DOCUMENTS

| 2003/0014286 | A1 | 1/2003 | Cappellini | |
| 2003/0163378 | A1* | 8/2003 | Podgurny et al. | 705/26 |
| 2003/0171940 | A1* | 9/2003 | Podgurny et al. | 705/1 |
| 2004/0088392 | A1 | 5/2004 | Barrett et al. | |
| 2005/0004978 | A1 | 1/2005 | Reed et al. | |

OTHER PUBLICATIONS

Southworth et al., F., "Intermodal and international freight network modeling", Transportation Research Part C 8, pp. 147-166, 2000.*
Chayanupatkul et al., A., "Freight Routing and Containerization in a Package Network that Accounts for Sortation Constraints and Costs", Metrans Project 03-07, pp. 1-91, Feb. 2004.*
Boardman et al., B., "Computer Assisted Routing of Intermodal Shipments", Computers Industrial Engineering vol. 33, Nos. 1-2, pp. 311-314, 1997.*
Xu et al., J., "Simulation of Regional Freight Movement on the TTMNet: Trade & Transportation Multi-Networks", TRB 2003 Annual Meeting, pp. 1-20, 2003.*
Nault et al., B., "Agent-intermediated electronic markets in international freight transportation", Decision Support Systems 41, pp. 787-802, 2006.*
PCT International Search Report for International Application PCT/US07/12923 dated Jan. 18, 2008. (1 page).

* cited by examiner

*Primary Examiner* — Jeffrey A Gaffin
*Assistant Examiner* — Adrian Kennedy
(74) *Attorney, Agent, or Firm* — Lewis and Roca LLP (57) ABSTRACT

A system and method for intelligent data management enables the transport of items within a network by creating a first database defining a transport path of an item from an origin facility to a destination facility, and operations that affect the transport of items. In order to update the transport path and operations, a data management application receives changes. The application, and associated data storage device, includes user profile, table, network model and development model databases. Modules within the application manage users and data, implement ad hoc and holiday schedules, report errors, verify changes and create new databases to reflect the changes.

23 Claims, 4 Drawing Sheets

SYSTEM AND METHOD FOR INTELLIGENT DATA MANAGEMENT OF THE TRANSPORT OF ITEMS WITHIN A TRANSPORT NETWORK

This application claims the benefit of U.S. Provisional Application No. 60/809,820 filed Jun. 1, 2006, which is incorporated herein by reference.

TECHNICAL FIELD

Systems and methods consistent with the present invention relate to data management. More particularly, the invention relates to systems and methods for managing data for carrier services.

BACKGROUND

The United States Postal Service ("USPS") is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving items, packages and the like.

Managing the transport of items is not simply a matter of moving the items from one point to another. Instead, after items leave their point of origin, they are typically moved through several transportation legs before arriving at their destination. In many instances, the origin of an item may be serviced by a first carrier's facility located in one geographic region, and the destination may be serviced by a second carrier's facility located in second geographic region. The two carriers may span the distance between their respective geographic regions by transporting the items through exchange facilities.

For instance, China Post may receive a package from a customer in Huhehoate, China for delivery to an individual in Leesburg, Va. In a first leg, China Post may transport the package from an origin facility to an outbound exchange facility in Beijing for international shipment. Next, in a second leg, the outbound exchange facility may transport the package by airplane to an inbound exchange facility in; for example, Dulles, Va., where the package is received by the USPS. Then, in a third leg, the USPS may transport the package to a destination post office, for delivery to the recipient in Leesburg, Va.

Although this system may appear simple in the context of a single package, managing such a system becomes an enormous task when the transport network includes thousands of origins and destinations, hundreds of exchange facilities and/or multiple carrier services. Data management is therefore critical for carriers to control the movement of items in the transport network.

To manage a network such as that described above, carriers may rely on a network model that defines the end-to-end paths based on the transport legs between each facility within the network. However, because the various legs may be linked through common facilities, even minor errors in the network model may cascade throughout the network and result in costly problems. For example, if the data describing the flight schedules used at a carrier's exchange facility is incorrect, the errors may impact each facility having transport legs linked through that exchange.

There are many potential sources of error that may corrupt a network model. For instance, data submitted by the carriers may include typographical mistakes, incorrectly formatted data, missing data, obsolete data, or other issues caused by human error. Furthermore, failure by carriers to provide updated data inputs for inclusion in the network model by prescribed deadlines may cause the network model to rely on out-of-date data. For instance, an update of the network model may be required on a periodic basis corresponding to operational changes, such as seasonal shifts in flight schedules. However, if one or more facilities fail to deliver data on time, the network model cannot be updated before the operational changes come into effect. Consequently, the network model will not reflect actual operations within the network.

The time and cost of identifying and correcting errors with the data supplied by facilities is a major concern for the carriers who rely on the network model. When data errors are identified, the data must typically be corrected by the responsible facility. Verification and testing of a network model may, in fact, take numerous corrective cycles during which data is repeatedly returned for correction. Moreover, there may be a long time lag from the time when data errors are discovered and the time corrected data is returned by the responsible carrier facility. Once the data is corrected, the verification and testing process must be restarted. Each of these corrective cycles cost the carriers time and money, and may result in a failure to complete an updated network model in time to meet operational deadlines.

In view of the foregoing, there is a need for systems and methods for providing software that addresses one or more of the above-noted problems and/or disadvantages by improving the management of data.

SUMMARY

Embodiments consistent with the present invention provide methods and systems for managing software content. Further, in accordance with aspects of the invention, the software may correspond to any type of application, software package, or framework.

In one embodiment, methods and systems are provided for intelligent data management that enables the transport of items within a network by creating a first database defining a transport path of an item from an origin facility to a destination facility, and operations that affect the transport of items. In order to update the transport path and operations, a data management application receives changes. The application, and associated data storage device, includes user profile, table, network model and development model databases. Modules within the application manage users and data, implement ad hoc and holiday schedules, report errors, verify changes and create new databases to reflect the changes.

In other embodiments, the methods and systems can be provided for receiving data from one or more carrier services including first-leg data defining the transport of items from origin locations to outbound exchange facilities, second-leg data defining the transport of the items from the outbound exchange facilities to inbound exchange facilities, and third-leg data defining the transport of the items from the inbound exchange facilities to destination locations. By linking the first-, second-, and third-leg data in succession, a data management system creates a database defining the end-to-end paths of the items from the origin to the destination.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments consistent with aspects of the present invention and together with the description, serve to explain the principles of the invention. In the drawings.

DETAILED DESCRIPTION

The following detailed description refers to the accompanying drawings. Where appropriate, the same reference numbers in different drawings refer to the same or similar elements.

Figure 1:
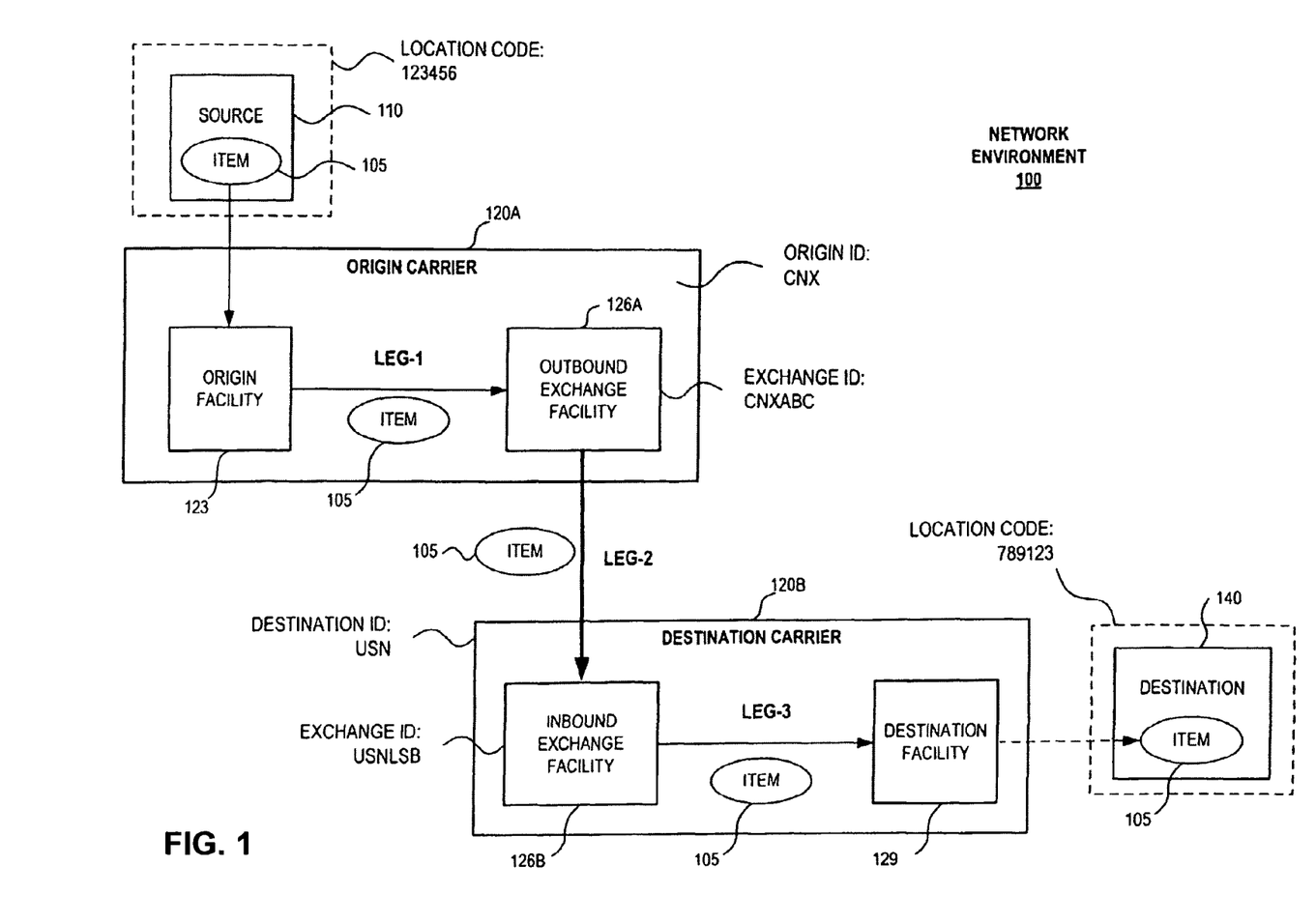
FIG. 1 is a block diagram illustrating a network environment consistent with the present invention.

FIG. 1 illustrates an exemplary network environment 100, consistent with the present invention. As described in more detail below, network environment 100 provides for the transport of an item 105 from a source 110 to a destination 140 by way of an origin carrier 120A and a destination carrier 120B (collectively "carriers 120"). Item 105 may be any portable object or good. For the purposes of example, item 105 may be mail, such as letters and packages, being transported internationally between carriers 120. Carriers 120 may be services, such as the United States Postal Service, China Post, Federal Express™, United Parcel Service™, etc., that transport and deliver items such as mail, letters, packages, periodicals, or the like. Source 110 and destination 140 may be the delivery address of customers of the respective carriers 120. A customer may be any individual, organization, business, or other entity having a delivery address within network environment 100.

As shown in FIG. 1, both source 110 and destination 140 may be associated with respective location codes 123456 and 789123 denoting physical regions in which source 110 and destination 140 are located. Location codes 123456 and 789123 may be used in network environment 100 to aid in the sorting and routing of item 105 and/or other delivery items between facilities. One of ordinary skill in the art will appreciate that while described as being in separate regions and serviced by different carriers 120, source 110 and destination 140 may alternatively be within the same country or region and/or serviced by a single carrier 120.

Consistent with aspects of the present invention, origin carrier 120 may include an origin facility 123 and an outbound exchange facility 126A. Origin facility 123 may be a facility operated by origin carrier 120A that concentrates items received from customers, including item 105 received from source 110. After receiving item 105, origin facility 123 may process the item 105 and store data in association with the item 105 including, for example, source and destination location codes 123456 and 789123, an origin ID CNX, an exchange ID CNXABC, a destination ID USN, and an exchange ID USNLSB. Once processed, origin facility 123 may transport item 105 to exchange facility 126A.

Outbound exchange facility 126A may be a facility operated by carrier 120A that receives item 105 from origin facility 123 and provides for the transport of item 105 to destination carrier 120B via inbound exchange facility 126B. For example, outbound exchange facility 126A may be an airport shipping hub that receives packages from various origin facilities 123, sorts them according to their destination 140 location code, and places the packages on the proper airplanes for transport.

Similarly to origin carrier 120A, destination carrier 120B may include an inbound exchange facility 126B and a destination facility 129. Inbound exchange 126B may be a facility operated by carrier 120B that receives items from one or more outbound exchange facilities 126A, scans and processes the items, and sorts the items for transport to the proper destination facility 129.

Destination facility 129 may be a facility operated by carrier 120B that receives item 105 for delivery from exchange facility 126A to destination 140. Upon receipt, destination facility 129 may sort the item 105 based, at least in part, on the destination location code 789123 associated with the item 105. Destination facility 129 may be, for example, a USPS post office that receives an item 105, such as a package, sorts the package according to a postal code, and transports the package to a destination such as a mailing address.

As shown in FIG. 1, item 105 may be transported from its source 110 to destination 140 through carriers 120. Each link between the carriers' facilities is referred to as a "leg". In particular, leg-1 may include the transport of item 105 from origin facility 123 to outbound exchange facility 126A. Leg-2 may include the transport of item 105 from outbound exchange facility 126A to inbound exchange facility 126B. In some embodiments, transport between exchange facilities 126A and 126B (collectively "exchange facilities 126") may be accomplished by typical methods (e.g., air, sea, road, and rail). Further, leg-3 may denote transporting the item 105 from inbound exchange 126B facilities to destination facility 129.

As will be understood by one of ordinary skill in the art, although only one path is illustrated in FIG. 1 for the sake of simplicity and clarity, there may be many sources 110 delivering items to many destinations 140 via different legs 1, 2 and 3 in a network environment 100. Further, there may be, of course, more than one set of exchange facilities located in one or more localities and operated by various carriers 120.

Figure 2:
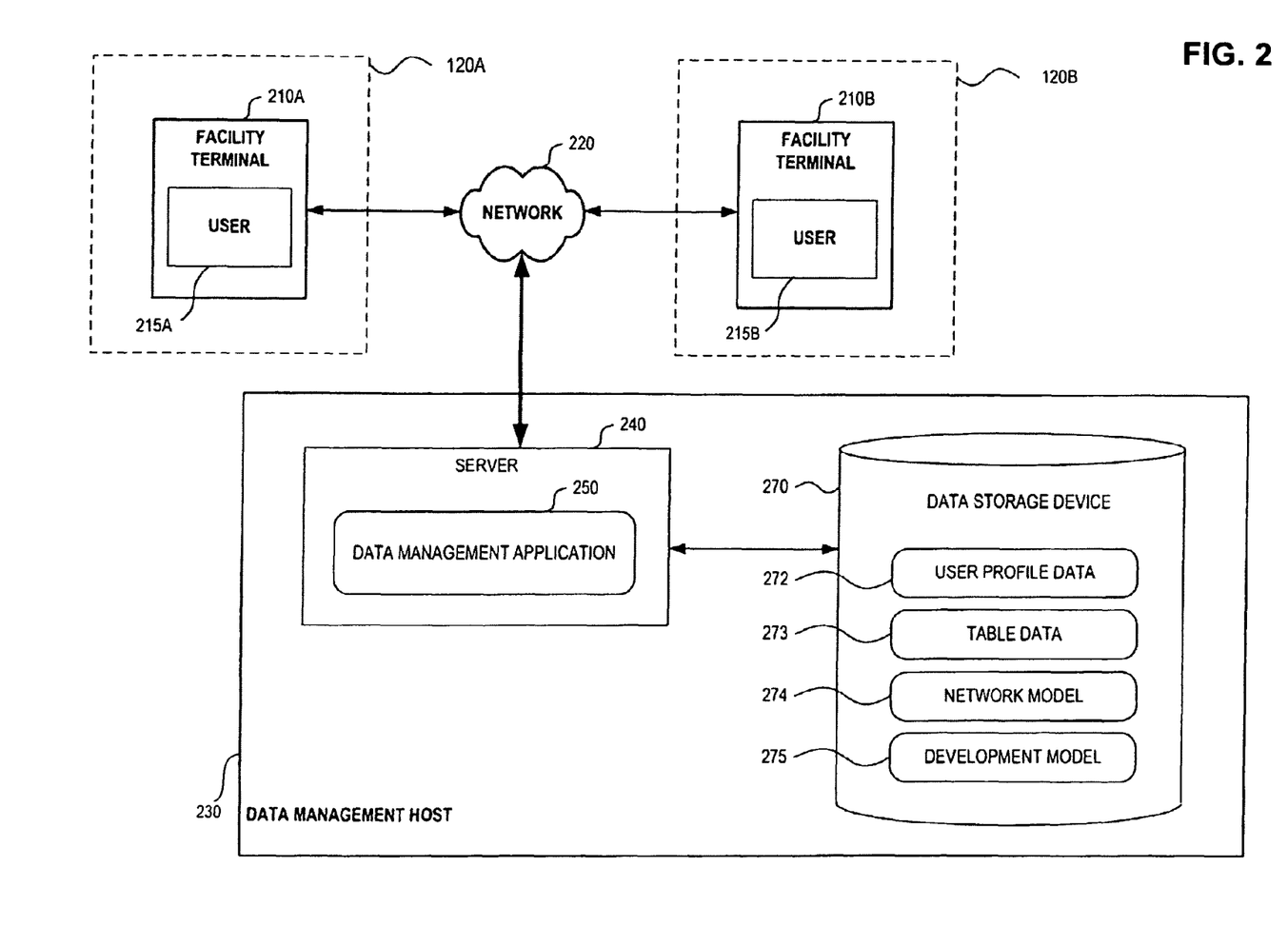
FIG. 2 is a block diagram illustrating exemplary hardware and software, consistent with the present invention.

FIG. 2 illustrates exemplary hardware and software consistent with the present invention, including facility terminals 210A and 210B, a data network 220 and a data management host 230. Facility terminals 210A and 210B (collectively "facility terminals 210") may be one or more data processing systems that perform computer-executed processes for providing users 215A and 215B (collectively "users 215") with interfaces to network 220 for accessing data and applications hosted by data management host 230. Users 215 may be individuals who input and manage data for network models using one of facility terminals 210. For example, users 215 may be employees of carriers 120. Users 215 can also access and amend data such as source and destination location codes 123456 and 789123, origin ID CNX, exchange ID CNXABC, destination ID USN, or exchange ID USNLSB.

Facility terminals 210 may be implemented as one or more data processing systems including, for example, a computer, a personal computer, minicomputer, microprocessor, workstation, or similar computer platform typically employed in the art. Facility terminals 210 may be implemented in any type of computer operating environment, such as hand-held devices, multiprocessor systems, microprocessor-based or programmable sender electronic devices, minicomputers, mainframe computers, and the like.

Facility terminals 210 may be comprised of components including a processor, a random access memory (RAM), a program memory (for example, read-only memory (ROM)), a flash ROM, a hard drive controller, a video controller, and an input/output (I/O) controller coupled by a processor (CPU) bus. In exemplary embodiments, facility terminal 210 may include a display and one or more user input devices that are coupled to facility terminal 210 via, for example, an I/O bus.

Facility terminals 210 may execute software applications consistent with carrying out the present invention, including network communications and user interface software. Network communications software may encode data in accordance with one or more of the standard network communication protocols to enable communication between facility terminals 210 and data management host 230 over data network 220.

Data network 220 may comprise, for example, a local area network (LAN) or a wide area network (WAN). Such networking environments are commonplace in offices, enterprise-wide computer networks, intranets, and the Internet, and are known by those skilled in the art. When a LAN is used as network 220, a network interface located at any of the processors may be used to interconnect any of the processors. When network 220 is implemented in a WAN networking environment, such as the Internet, the processors may typically include an internal or external modem (not shown) or other means for establishing communications over the WAN. Internal or external modems may also include routers for network communication clarity. Further, in utilizing network 220, data sent over network 220 may be encrypted to insure data security by using known encryption/decryption techniques.

In addition to utilizing a wire-line communications system as network 220, a wireless communications system, or a combination of wire line and wireless may be utilized as network 220 in order to, for example, exchange web pages via the Internet or an intranet, exchange e-mails via the Internet, or for utilizing other communications channels. Wireless can be defined as radio transmission via the airwaves. However, it may be appreciated that various other communication techniques can be used to provide wireless transmission, including infrared line-of-sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

Data management host 230 may host data management application 250 for carriers 120 and their respective facilities 123, 126A, 126B and 129. As described in more detail below, host 230 may administer and maintain the data management application 250, as well as the server 240 and data storage devices on which the application 250 resides. In addition to data management application 250, host 230 may perform administrative tasks such as lifecycle management, upgrading system components, updating or replacing software, and archiving data.

Server 240 may be one or more processing devices that execute software modules stored in one or more computer memory devices. Server 240 may include components typically included in a server system, such as a data processor (not shown), network interface (not shown) and data storage device 270. For example, server 240 may include a computer, a personal computer, a minicomputer, a microprocessor, a workstation or similar computer platform typically employed in the art. Furthermore, as describe below, server 240 may execute a plurality of applications including software for managing network communications, providing a user interface, managing databases (e.g., database management system), and providing applications over network 220 (e.g., application server).

Furthermore, server 240 may execute data management application 250. As described in greater detail below, data management application 250 may be an integrated set of computer program modules for managing data for network environment 100, consistent with aspects of the present invention.

Consistent with the present invention, host 230 and facility terminals 210 may have a client-server relationship and, accordingly, server 240 may include application software for hosting facility terminals 210. In other implementations, host 230 may be a stand-alone desktop application that receives data from carriers 120 stored on, for example, portable media (e.g., CD-ROM) and may also transmit data by methods and processes other than, or in combination with, network 220. These methods and processes may include, but are not limited to, transferring data via diskette, CD ROM, facsimile, conventional mail, memory stick, or over a publicly switched telephone network.

Data storage device 270 may be associated with server 240 for storing software and data consistent with the present invention. Storage device 270 may be implemented with a variety of components or subsystems including, for example, a magnetic disk drive, an optical disk drive, flash memory, or other devices capable of storing information. Further, although data storage device 270 is shown linked to host server 240, it may instead be located internally to the host 240. In other embodiments, data storage device 270 may be located within each facility terminal 210, or it may be configured as network attached storage (NAS) devices accessible remotely by host 230 over network 220.

Data storage device 270 may store user profile data 272, table data 273, network model 274 and development model 275. User profile data 272 may be information collected by data management application 250 describing each user and stored in data storage device 270. The collected data may describe a user's 215 role (e.g., responsibility) and preferences for the presentation, formatting and grouping of data by data management application 250. In addition, user profile data 272 may include user authorization data such as login identification, passwords, privileges, and the like.

Table data 273 may include leg-1 tables, leg-2 tables, leg-3 tables, sorting tables, and holiday tables for carriers 120. An exemplary leg-1 table may store data for transporting an item 105 received from origin facility 123 to an outbound exchange facility 126A. This data may include, for example, an origin country code, an origin location code, an origin facility location, a cutoff arrival time for transport, and an outbound exchange facility name. An exemplary leg-2 table may store data for transporting an item 105 received from outbound exchange facility 126A to inbound exchange facility 126B. This data may include, for example, a country code, destination location code, cut off arrival time for transport, earliest scheduled flight, latest scheduled flight, and flight arrival days. An exemplary leg-3 table may store data for receiving and transporting items to a destination facility 129 or a destination 140. For example, this data may include, a destination country code, inward exchange facility name, cut-off arrival time for transport, destination location code, destination address, and delivery type (e.g., standard, Saturday, Sunday, holiday). An exemplary sorting table may including data associating outbound exchange facility 126A with each destination location code linked to the exchange facility 126A. An exemplary holiday table may include data defining holidays or other days during which deliveries are not made for each exchange facility 126 and/or carrier 120.

Network model 274 may be a database including end-to-end transport links from each origin facility 123 to each destination facility 129 in network environment 100 based on, for instance, leg-1 tables, leg-2 tables, leg-3 tables, sorting tables and holiday tables provided by carriers' facilities. The network model 274 may link the legs in the transport network from end-to-end between any two location codes taking in to account, for example, routing, flight schedules, holidays, and time zones. In addition, network model 274 may associate international and domestic location codes with an associated city name, state/province name, and destination facility 129.

Development model 275 may be a version of the current network model 274 that links table data 273 received from carriers 120 for cleaning, validation, and testing prior to updating and/or replacing the existing operational network model 274. After testing and/or approval, the development model 275 (including the leg-1 tables, leg-2 tables, leg-3 tables, sorting tables and holiday tables), may replace, in whole or in part, the tables included in current network module 274.

Figure 3:
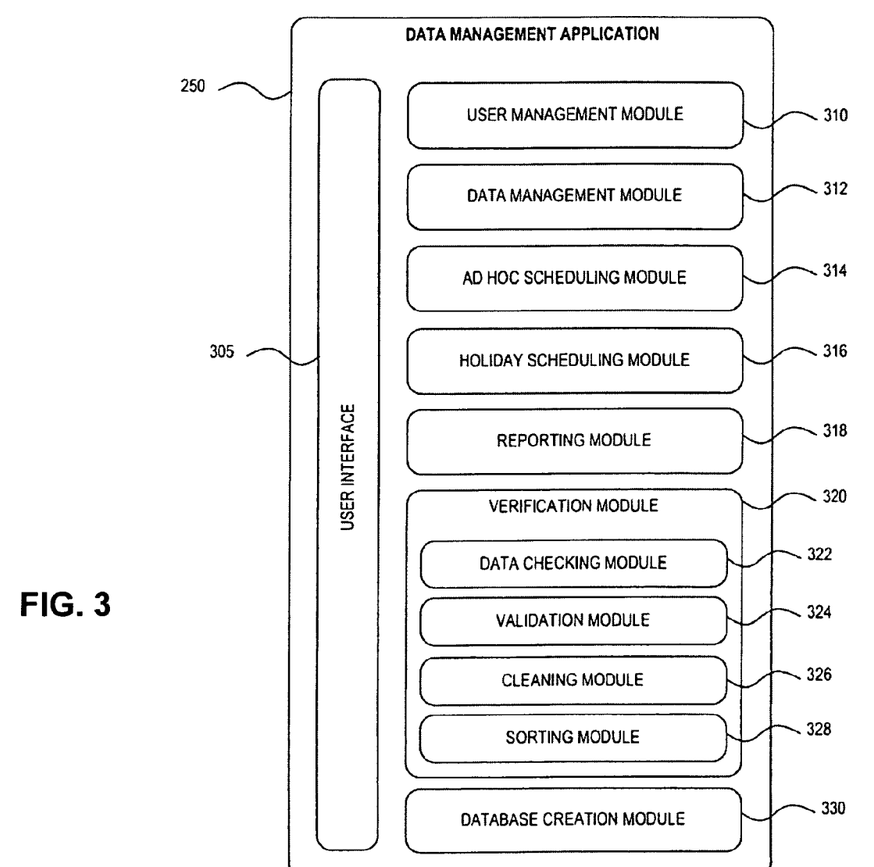
FIG. 3 is block diagram illustrating exemplary software, consistent with the present invention.

FIG. 3 provides an exemplary block diagram of data management application 250. Data management application 250 is designed around operations processes and work flows and enables full automation of item 105 routing between source 110 and destination 140. Data management application 250 may include various program modules 310-330 for validating, controlling, governing, verifying, creating, testing, and managing network model 274. It may also include programs for alerting users of various errors in the data. For example, data management application 250 may include user interface 305, user management module 310, data management module 312, ad hoc scheduling module 314, holiday scheduling module 316, reporting module 318, verification module 320, and database creation module 330.

User interface 305 may include computer-executable instructions for providing a user interface for controlling data management application 250. User interface 305 may enable users 215 to launch data management modules 310-330, as well as provide role-based user interfaces for viewing and controlling these modules. User interface 305 may, for example, be implemented as graphical user interface including conventional screen elements, such as menus, lists, tables, icons, action buttons, and selection or text entry fields, for these purposes. User interface 305 may be customized to particular users 215 and/or personalized to display information or modules according to user profile data 272 stored in data storage device 270. Moreover, a user interface 305 may provide user-assistive interfaces (a.k.a. "wizards") that may progressively lead a user 215 through data entry or operational processes, consistent with aspects of the present invention.

User management module 310 may include computer-readable instructions for creating and modifying user profile data 272, consistent with aspects of the present invention. Through a user interface, user management module 310 may present user-selectable options for defining the user's 215 preferences for language, data type, data display, data format, and data groupings. This data may be stored as user profile data 272 in data storage device 270, where it may be referenced by user interface 305 and other modules of data management application 250.

Data management module 312 may include computer-readable instructions for enabling users 215 to access, view, input, store, and/or export data for data management application 250, consistent with aspects of the present invention. By way of data management module 312, a user 215 may selectively manage leg-1 tables, leg-2 tables, leg-3 tables, sorting tables, and holiday tables. Furthermore, data management module 312 may enable a user 215 to import tables and other data from table data 273 stored on data storage device 270. For instance, through a graphic user interface presented by user interface 305, a user 215 selects tables to import to facility terminal 210 to correct data issues. In some instances, data management module 312 may require that user 215, for version control purposes, check-in and check-out tables the user 215 has selected for import.

Once tables are imported into facility terminal 210, a user 215 may, for example, view the selected data table, sort and/or filter the table data, input new data, or modify the existing data to resolve errors and other issues. For instance, users 215 may sort and view reports. In addition, user 215 may view and manage the table data based on various data classifications such as leg-1 data, leg-2 data, leg-3 data, transportation schedules, sorting tables, holiday tables, airports, locations, and exchange facility locations.

After user 215 finishes working on a table, a user 215 may check in the table to data management application 250 for storage. In addition, after completing work with the data, a user 215 may export the table to host 230 for data verification and testing by verification module 320.

Data management module 312 may also create logs of user 215 activities. The logs may, for example, track events such as when a user loads a table, whether the load was successful, and/or or whether the load included data issues. This log may be provided to reporting module 318 for reporting to other users 215.

Ad hoc module 314 may include computer-readable instructions enabling the entry of ad hoc schedule requests. For instance, a carrier 120 may request a flight schedule change or rerouting during a specified period in response to nonstandard events, such as acts of nature (e.g., hurricanes) which alter typical operational schedules. Along with the request, the carrier 120 may specify leg-1, -2 and -3 data for the ad hoc schedule. The request may be logged by ad hoc module 314 and reported to reporting module 318.

Holiday scheduling module 316 may include computer-readable instructions enabling a user 215 to load, view, and modify holiday tables. Using the holiday scheduling module, a user 215 may enter holidays or other non-work days for a carrier 120 and/or each of the facilities 123, 126 or 129.

Reporting module 318 may include computer-readable instructions for providing status reports. Based on logs generated by modules 310-316, reporting module 318 may send facility terminals 210 reports of current or future events occurring within data management application 250 including, for instance, upcoming data submission deadlines (calendar dates), table updates, addition of new carriers or facilities, requests for ad hoc schedule changes, and user activity notices (e.g., user data check in/out). In addition, reporting module 318 may provide notification of data errors based on error logs received from verification module 320.

Verification module 320 may include computer-readable instructions for testing the network model 274 and its associated leg-1, leg-2, leg-3, sorting and holiday tables. As shown in FIG. 3, verification may include data checking module 322, validation module 324, cleaning module 326 and sorting module 328. Data checking module 322 may analyze each table submitted by a carrier 120 for incorrect, missing, duplicate, overlapping, and incorrectly formatted table entries. Based on the results, data checking module 322 may generate a log of data issues that may be provided, for example, to reporting module 318.

Validation module 324 may include computer-readable instructions for converting all legs identified in leg-1, leg-2, and leg-3 tables from the carriers 120 into a distinct table for each of the legs. After combining the tables, validation module 324 may analyze the table data 273 for incorrect, missing, duplicate, overlapping, and incorrectly formatted table entries. Based on the results, validation module 324 may generate a log of any data errors identified, and provide the log, for example, to reporting module 318.

Data cleaning module 326 may include computer-readable instruction for performing a series of data queries on the table data to detect errors. For instance, data cleaning module 326 may perform queries that check some or all of the end-to-end transport paths between legs-1, -2 and -3. Based on the results, data cleaning module may generate a log of data errors that may be provided, for example, to reporting module 318.

Sorting module 328 may include computer-readable instructions for executing a set of sorting rules and other data to verify the proper sorting of an item 105 based on location codes. Sorting module 328 performs successive queries on the submitted table data 273 that check some or all links defined in a sorting table for leg-2 tables that connect items between leg-1 tables and leg-3 tables. Based on the results, sorting module 328 may generate a log of data errors that may be provided, for example, to reporting module 318.

Database creation module 330 may be computer-readable instructions for combining the legs-1, -2 and -3 tables into a network model 274 based on the associations between outbound exchange stations 126A and destination location codes defined in the sorting tables. Database creation module 330 may link, in succession, legs-1, -2 and -3 tables to define end-to-end links for each origin location code and each destination location code. Database creation module 330 may, for example, create network model 274 as a SQL (structured query language) database.

Figure 4:
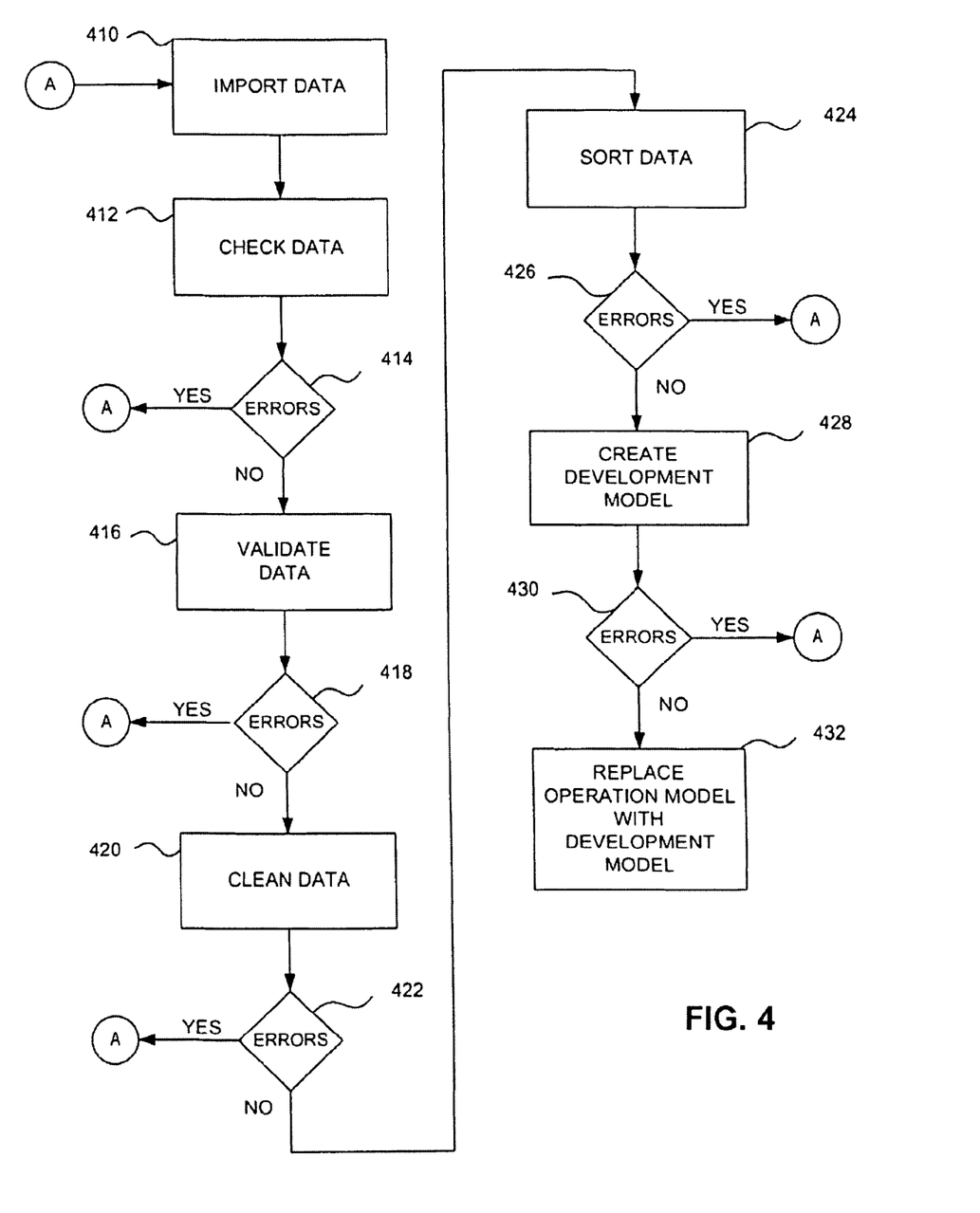
FIG. 4 is a flowchart, consistent with an embodiment of the present invention.

FIG. 4 shows a block diagram illustrating a process for creating and updating a network model 274, consistent with the present invention. First, at A, each carrier facility 123, 126, and 129 sends table data 273 to host 230. The host 230 may receive table data 273 describing the transport legs including leg-1 tables, leg-2 tables, leg-3 tables, sorting tables, holiday tables and/or ad hoc data (Step 410). The table data 273 created or modified by each carrier facility may be imported to data management application 250 through, for example, data management module 312.

Next, the imported table data may be checked (Step 412) by data checking module 322 to identify, for example, any incorrect, missing, overlapping, or redundant data. If errors are detected (Step 414, "Yes"), then the process is halted and, at A, the responsible carrier facilities 123, 126, and 129 are notified by reporting module 318 of the data errors discovered. A responsible carrier facility 123, 126 and/or 129 then corrects the data error and resubmits the table data. Otherwise, if no errors are detected (Step 414, "No"), the process proceeds to validate the data (Step 416).

Data may be validated by way of validation module 324 which converts all legs identified in leg-1, leg-2, leg-3 tables from the carriers 120 into distinct tables for each of the legs. After combining the tables, validation module 324 may analyze the table data 273 for incorrect, missing, duplicate, overlapping, and incorrectly formatted table entries. If errors are detected (Step 418, "Yes"), then the process is halted and, at A, the responsible carrier facilities 123, 126, and 129 are notified by reporting module 318 of the data errors discovered. A responsible carrier facility 123, 126 and/or 129 then corrects the data error and resubmits the table data. Otherwise, if no errors are detected (Step 418, "No"), the process proceeds to clean the data (Step 420).

During data cleaning, data cleaning module 326 may perform successive queries on the submitted table data that check the transport paths between legs-1, -2 and -3. If errors are detected by data cleaning module 326 (Step 422, "Yes"), then the process stops and the errors are reported, at A, to the responsible carrier facilities 123, 126, and 129 for correction and resubmission. If no errors are detected (Step 422, "No") the process proceeds to sorting the data.

In a sorting data step (Step 424), sorting module 328 may perform successive queries on the submitted table data that check some or all sorting rules for leg-2 tables that sort items between leg-1 table and leg-3 tables. If errors are detected by data sorting module 328 (Step 426, "Yes"), then the process stops and the errors are reported, at A, to the responsible facility for correction and resubmission. If no errors are detected (Step 422, "No"), the process continues.

Once all errors reported by reporting module 318 are corrected and resubmitted, database creation module 330 may combine the tables into a development model 275 (Step 428) based on an association(s) between outbound exchange 126A and the destination location codes. By this process, database creation module 318 links the first-, second-, and third-leg data in succession, to allow the data management system to create development model 275 defining the end-to-end path of the item based on the origin and the destination using the checked, validated, cleaned and sorted data. The development model 275 may contain combined information regarding the created or modified table data 273 received by the host 230 from carrier facilities 123, 126 and 129. The development model 275 may additionally contain corrected data resubmitted from the facility responsible for an error detected by one of the modules 322, 324, 326, and 328.

Once the development model 275 has been created, database creation module 330 may test the development model 275 to ensure the paths between each location code are correct. If errors are detected by database creation module 330 (Step 430, "Yes"), then the process stops and the errors are reported to the responsible facility for correction and resubmission. If no errors are detected (Step 430, "No"), then the data management application may be uploaded with development model 276, which becomes operation network model 274 by replacing operation network model 274 (Step 432).

When development model 275 replaces network model 274, it includes changes to the leg-1, leg-2, leg-3, sorting and holiday tables, and other table updates such as source and destination location codes 123456 and 789123, origin ID CNX, exchange ID CNXABC, destination ID USN, and exchange ID USNLSB. The network model 274 then reflects accurate table data, including delivery type, codes, transportation schedules, cut offs, airports, locations, and exchange facilities, and any other operational changes that affect the transport of item 105 within network environment 100. The entire network environment 100 then has access to accurate transport data for the transport of item 105.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

The various programs or program content can be created using any of the techniques known to one skilled in the art or can be designed in connection with existing software. Such programs or program content can be designed in or by means of Java, C++, HTML, XML, or HTML programming environments with included Java applets, or in SAP R/3 or ABAP. One or more of such content can be integrated in existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as nonexclusive.

As disclosed herein, embodiments and features of the invention may be implemented through computer-hardware and/or software. Such embodiments may be implemented in various environments, such as networked and computing-based environments with one or more users. The present invention, however, is not limited to such examples, and embodiments of the invention may be implemented with other platforms and in other environments.

By way of example, embodiments of the invention may be implemented using conventional computers, personal computers (PCs), desktops, hand-held devices, multiprocessor computers, pen computers, microprocessor-based or programmable consumer electronics devices, minicomputers, mainframe computers, personal mobile computing devices, mobile phones, portable or facility personal computers, palm-top computers or the like.

The storage mediums and databases referred to herein symbolize elements that temporarily or permanently store data and instructions. Although storage functions may be provided as part of a computer, memory functions can also be implemented in a network, processors (e.g., cache, register), or elsewhere. While examples of databases have been provided herein, various types of storage mediums can be used to implement features of the invention, such as a read only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other computer readable media.

Embodiments consistent with the invention may also be embodied in computer program products that are stored in a computer-readable medium and in products that allow for transmission using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network can be a wired or a wireless network. To name a few network implementations, the network is, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention.

It is therefore intended that the specification and examples be considered as exemplary only, with a true scope and spirit of the invention being indicated by the following claims.

What is claimed is:

1. A method for managing data pertaining to the transport of items within a transport network, the method comprising:
    creating a first database comprising data defining a transport path of at least one item from an origin facility to a destination facility and defining operations affecting the transport of the at least one item;
    receiving data reflecting a change in the data defining the transport path or the data defining operations;
    modifying the data of at least one of the defined transport path or the defined operations to reflect the change;
    creating a second database containing the data of the at least one modified transport path or operation while the first database is still being used to route items for delivery;
    replacing the first database with the second database;
    routing an item for delivery according to the modified transport path data or operation data of the second database; and
    testing whether the modified transport path data or operation data is correct before replacing the first database.

2. The method of claim 1, further comprising:
    reporting an error based on the testing to a facility that sent the received data.

3. A method for managing data pertaining to the transport of items within a transport network, the method comprising:
    creating a first database comprising data defining a transport path of at least one item from an origin facility to a destination facility and defining operations affecting the transport of the at least one item;
    receiving data reflecting a change in the data defining the transport path or the data defining operations;
    modifying the data of at least one of the defined transport path or the defined operations to reflect the change;
    creating a second database containing the data of the at least one modified transport path or operation while the first database is still being used to route items for delivery;
    replacing the first database with the second database;
    routing an item for delivery according to the modified transport path data or operation data of the second database; and
    checking the received data for at least one of incorrect, missing, overlapping or redundant data.

4. A method for managing data pertaining to the transport of items within a transport network, the method comprising:
    creating a first database comprising data defining a transport path of at least one item from an origin facility to a destination facility and defining operations affecting the transport of the at least one item;

receiving data reflecting a change in the data defining the transport path or the data defining operations;

modifying the data of at least one of the defined transport path or the defined operations to reflect the change;

creating a second database containing the data of the at least one modified transport path or operation while the first database is still being used to route items for delivery;

replacing the first database with the second database;

routing an item for delivery according to the modified transport path data or operation data of the second database; and validating the modified data by analyzing the data for at least one of incorrect, missing, duplicate, overlapping, or incorrectly formatted data.

5. A method for managing data pertaining to the transport of items within a transport network, the method comprising:

creating a first database comprising data defining a transport path of at least one item from an origin facility to a destination facility and defining operations affecting the transport of the at least one item;

receiving data reflecting a change in the data defining the transport path or the data defining operations;

modifying the data of at least one of the defined transport path or the defined operations to reflect the change;

creating a second database containing the data of the at least one modified transport path or operation while the first database is still being used to route items for delivery;

replacing the first database with the second database;

routing an item for delivery according to the modified transport path data or operation data of the second database; and validating the modified data by analyzing the data for incorrect, missing, duplicate, overlapping, and incorrectly formatted data.

6. A method for managing data pertaining to the transport of items within a transport network, the method comprising:

creating a first database comprising data defining a transport path of at least one item from an origin facility to a destination facility and defining operations affecting the transport of the at least one item;

receiving data reflecting a change in the data defining the transport path or the data defining operations;

modifying the data of at least one of the defined transport path or the defined operations to reflect the change;

creating a second database containing the data of the at least one modified transport path or operation while the first database is still being used to route items for delivery;

replacing the first database with the second database; and routing an item for delivery according to the modified transport path data or operation data of the second database, wherein at least one of the first database or the second database are cleaned using successive queries to check the data of at least one of the defined transport path, the defined operations, the modified transport path, or the modified operations.

7. A method for managing data pertaining to the transport of items within a transport network, the method comprising:

creating a first database comprising data defining a transport path of at least one item from an origin facility to a destination facility and defining operations affecting the transport of the at least one item;

receiving data reflecting a change in the data defining the transport path or the data defining operations;

modifying the data of at least one of the defined transport path or the defined operations to reflect the change;

creating a second database containing the data of the at least one modified transport path or operation while the first database is still being used to route items for delivery;

replacing the first database with the second database;

routing an item for delivery according to the modified transport path data or operation data of the second database; and testing whether a leg of the modified transport path is correct before replacing the first database;

wherein: the first database includes:

first-leg data describing the transport of an item from at least one origin to at least one outbound exchange facility;

second-leg data describing the transport of the item from the at least one outbound exchange facility to at least one inbound exchange facility; and third-leg data describing the transport of the item from at least one inbound exchange facility to at least one destination; and wherein the step of creating a database includes defining the transport path of the item from the at least one origin to the at least one destination by linking in succession the first-leg data, the second-leg data and the third-leg data.

8. The method of claim 7, further comprising:

creating a sorting table for a leg of the modified transportation path between an outbound exchange facility and an inbound exchange facility; and checking the sorting table for errors before replacing the first database.

9. A method for managing data pertaining to the transport of items within a transport network, the method comprising:

creating a first database comprising data defining a transport path of at least one item from an origin facility to a destination facility and defining operations affecting the transport of the at least one item;

receiving data reflecting a change in the data defining the transport path or the data defining operations;

modifying the data of at least one of the defined transport path or the defined operations to reflect the change;

creating a second database containing the data of the at least one modified transport path or operation while the first database is still being used to route items for delivery;

replacing the first database with the second database; and routing an item for delivery according to the modified transport path data or operation data of the second database, wherein, the modifying takes place based upon the result of at least one of a checking, validating, or sorting step.

10. A method for managing data pertaining to the transport of items within a transport network, the method comprising:

creating a first database comprising data defining a transport path of at least one item from an origin facility to a destination facility and defining operations affecting the transport of the at least one item;

receiving data reflecting a change in the data defining the transport path or the data defining operations;

modifying the data of at least one of the defined transport path or the defined operations to reflect the change;

creating a second database containing the data of the at least one modified transport path or operation while the first database is still being used to route items for delivery;

replacing the first database with the second database;

routing an item for delivery according to the modified transport path data or operation data of the second database; and amending the received data after detecting an error in the received data.

11. The method of claim 10, wherein, the amending takes place based upon the result of at least one of user input, modification, or management of data.

12. The method of claim 10, wherein an amendment to the received data is logged.

13. The method of claim 10, wherein an amendment to the received data is verified.

14. A system for managing data pertaining to the transport of items within a transport network, the system comprising:
a first database comprising data defining a transport path of at least one item from an origin facility to a destination facility and defining operations affecting the transport of the at least one item;
data stored in a memory reflecting a change in the defined transport path or the defined operations;
a data management application including:
a verification module for modifying the data of at least one of the defined transport path or the defined operations according to the data reflecting the change;
a database creation module for creating a second database containing data for the modified transport path or modified operations while the first database is still being used to route items for delivery and for replacing the first database with the second database, wherein the database creation module tests whether the modified transport path data or the modified operations data are correct before replacing the first database; and
a network for routing an item for delivery according to the modified transport path data or the modified operations data of the second database.

15. The system of claim 14, wherein the data management application further comprises:
a reporting module for reporting an error based on the testing to a facility that sent the data reflecting the change.

16. A system for managing data pertaining to the transport of items within a transport network, the system comprising:
a first database comprising data defining a transport path of at least one item from an origin facility to a destination facility and defining operations affecting the transport of the at least one item;
data stored in a memory reflecting a change in the defined transport path or the defined operations;
a data management application including:
a verification module for modifying the data of at least one of the defined transport path or the defined operations according to the data reflecting the change, wherein the verification module further comprises:
a data checking module for checking the data reflecting the change for at least one of incorrect, missing, overlapping or redundant data;
a database creation module for creating a second database containing data for the modified transport path or modified operations while the first database is still being used to route items for delivery and for replacing the first database with the second database; and
a network for routing an item for delivery according to the modified transport path data or the modified operations data of the second database.

17. A system for managing data pertaining to the transport of items within a transport network, the system comprising:
a first database comprising data defining a transport path of at least one item from an origin facility to a destination facility and defining operations affecting the transport of the at least one item;
data stored in a memory reflecting a change in the defined transport path or the defined operations;
a data management application including:
a verification module for modifying the data of at least one of the defined transport path or the defined operations according to the data reflecting the change, wherein the verification module further comprises:
a validation module for validating the data reflecting the change by analyzing the data for at least one of incorrect, missing, duplicate, overlapping, or incorrectly formatted data;
a database creation module for creating a second database containing data for the modified transport path or modified operations while the first database is still being used to route items for delivery and for replacing the first database with the second database; and
a network for routing an item for delivery according to the modified transport path data or the modified operations data of the second database.

18. A system for managing data pertaining to the transport of items within a transport network, the system comprising:
a first database comprising data defining a transport path of at least one item from an origin facility to a destination facility and defining operations affecting the transport of the at least one item;
data stored in a memory reflecting a change in the defined transport path or the defined operations;
a data management application including:
a verification module for modifying the data of at least one of the defined transport path or the defined operations according to the data reflecting the change, wherein the verification module further comprises:
a cleaning module for using successive queries to check the data of at least one of the defined transport path, the defined operations, the modified transport path, or the modified operations;
a database creation module for creating a second database containing data for the modified transport path or modified operations while the first database is still being used to route items for delivery and for replacing the first database with the second database; and
a network for routing an item for delivery according to the modified transport path data or the modified operations data of the second database.

19. A system for managing data pertaining to the transport of items within a transport network, the system comprising:
a first database comprising data defining a transport path of at least one item from an origin facility to a destination facility and defining operations affecting the transport of the at least one item;
data stored in a memory reflecting a change in the defined transport path or the defined operations;
a data management application including:
a verification module for modifying the data of at least one of the defined transport path or the defined operations according to the data reflecting the change, wherein the verification module modifies at least one of the defined transport path data or the defined operations data based upon a result from at least one of a data checking module, validation module, cleaning module or sorting module;

a database creation module for creating a second database containing data for the modified transport path or modified operations while the first database is still being used to route items for delivery and for replacing the first database with the second database; and a network for routing an item for delivery according to the modified transport path data or the modified operations data of the second database.

20. A system for managing data pertaining to the transport of items within a transport network, the system comprising:

a first database comprising data defining a transport path of at least one item from an origin facility to a destination facility and defining operations affecting the transport of the at least one item;

data stored in a memory reflecting a change in the defined transport path or the defined operations;

a data management application including:
 a verification module for modifying the data of at least one of the defined transport path or the defined operations according to the data reflecting the change;
 a database creation module for creating a second database containing data for the modified transport path or modified operations while the first database is still being used to route items for delivery and for replacing the first database with the second database;

a network for routing an item for delivery according to the modified transport path data or the modified operations data of the second database; and a reporting module for reporting errors found by at least one of a data checking module, validation module, cleaning module, sorting module or database creation module.

21. The system of claim 20, wherein the data management application further comprises:
 a user interface for enabling a user to amend the received data in response to a reported error from the reporting module; and
 a data management module for managing amendments made by the user.

22. The system of claim 21, wherein the data management application further comprises:
 a data management module for logging amendments to the data reflecting the change.

23. The system of claim 21, wherein a verification module verifies amendments to the received data.

* * * * *